Jan. 15, 1929. Re. 17,194

G. H. WHITTINGHAM

TUNING DEVICE

Original Filed Aug. 28, 1924

INVENTOR
George H. Whittingham
BY
Cavanagh & James
ATTORNEYS

Reissued Jan. 15, 1929.

Re. 17,194

UNITED STATES PATENT OFFICE.

GEORGE H. WHITTINGHAM, OF BALTIMORE, MARYLAND, ASSIGNOR, BY MESNE ASSIGNMENTS, TO TECHNIDYNE CORPORATION, OF NEW YORK, N. Y., A CORPORATION OF NEW YORK.

TUNING DEVICE.

Original No. 1,581,900, dated April 20, 1926, Serial No. 734,670, filed August 28, 1924. Application for reissue filed March 24, 1928. Serial No. 264,476.

This invention relates to transformer and coil systems, and has special reference to the provision of improved transformers and coil systems adapted for use with electron discharge devices or relays such as are employed in radio circuits or systems.

It has been found that a primary factor in the production of an undesirable high rate of variation of amplification with frequency in amplifying transformers of prior types is the occurrence of a second mode of oscillation in the windings which may be called a short wave oscillation. All prior types of transformers are subject to this mode of short wave oscillation in a frequency band closely adjacent to the frequency band for which the transformer is designed. In the prior art attempts have been made to utilize this second mode of oscillation by modifying the design so as to include it in the frequency band for which the transformer is designed. This short wave mode of oscillation is primarily due to the leakage of magnetic flux between the primary and secondary windings of the transformer. In transformers which are wound in opposite directions, the frequency of the short wave oscillation is determined in a general way by a capacity which is mainly the sum of the distributed capacities of the primary and secondary widings and an inductance which is approximately the parallel inductance of the primary and secondary windings. In transformers wound in the same direction, the short wave oscillation is again determined by a capacity which, however, in this case is mainly the capacity between the primary and secondary windings and an inductance which is approximately the series inductance of the primary and secondary windings.

It has been found that it is feasible to completely suppress this objectionable short wave mode of oscillation by eliminating completely or substantially completely the leakage inductance between the windings of the transformer. This it has been found can be accomplished by winding the primary and secondary of the transformer bifilarly, with the filaments of said windings arranged in close juxtaposition so that the leakage inductance between the windings is substantially completely eliminated. In order to completely suppress this objectionable short wave mode of oscillation, care should be taken in winding the primary and secondary filaments of the transformer so as to produce a substantially unity coupling between the primary and secondary transformer windings, and by this is meant that the primary and secondary windings should nowhere be separated by a space greater than the space occupied by the insulation coverings of the wires or filaments.

A prime object of my present invention, therefore, is to provide a transformer having a bifilar construction so designed as to effect the elimination of the leakage inductance between the windings, all to the end of obviating or completely suppressing the short wave mode of oscillation.

This invention further relates to tuning devices, and more particularly to an inductive coupling between the primary and secondary inductance of an apparatus for receiving radiant energy. In radio receiving apparatus, it is usually preferable to embody a secondary or grid circuit, which is inductively coupled to the primary circuit, instead of being a wing circuit directly connected thereto. One of the objects of the invention is to provide a structure of maximum efficiency for coupling the primary and secondary circuits without direct electrical connection. A further object of the invention is to so couple the primary and secondary circuits that the tickler coil can be placed in maximum inductive relationship with both the primary and secondary inductances simultaneously. A further object is to provide a structure of this type in which the capacity between the primary inductance and a portion of the secondary inductance is relatively large, and such that the primary inductance and such portion of the secondary inductance bear the same capacitative relation to the tickler at all times. A still further object of the invention is to provide simple and efficient mounting means for the support on which the inductances are wound and for the tickler coil. Still further objects of the invention and features of novelty will be apparent from the following description when taken in conjunction with the accompanying drawings, in which:

Figure 1:
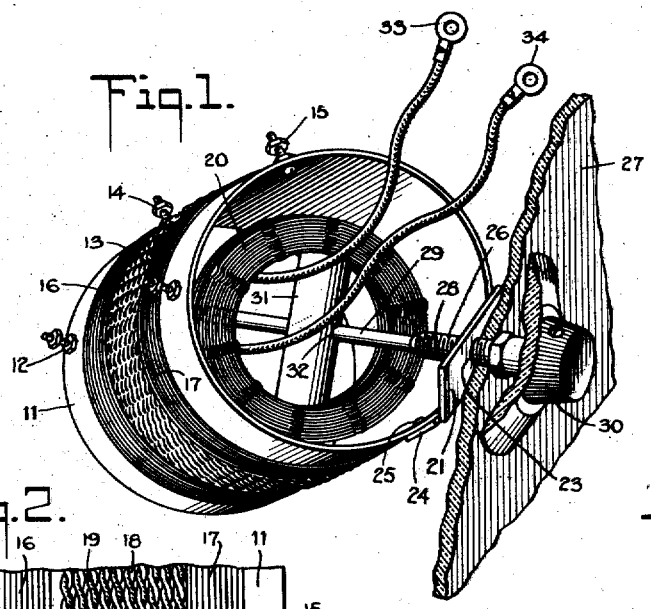
Fig. 1 is a perspective view of a tuning device embodying the invention as it appears when mounted upon a panel, the panel and operating knob being shown as broken away to more clearly disclose the structure.
Figure 2:
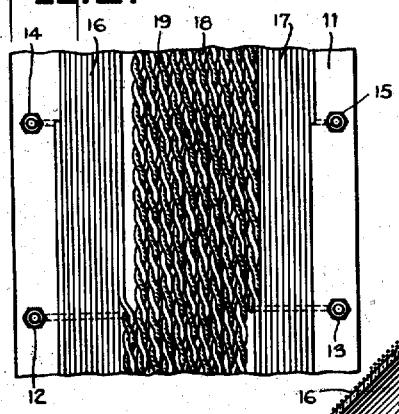
Fig. 2 is a fragmentary view in elevation of the form and windings shown in Fig. 1.

As shown in the drawings, the primary and secondary inductances are wound upon a cylindrical tube or form 11, upon which binding posts 12, 13, 14 and 15 may be conveniently mounted, the primary circuit extending between binding posts 12 and 13, and the secondary between binding posts 14 and 15. The secondary circuit is divided into three portions, the end portions comprising windings 16 and 17, preferably equal in number, and the central portion comprising windings 18 which are formed into a twisted pair with the windings 19 of the primary inductance. Thus, the primary inductance as well as that portion of the secondary inductance with which it is most closely coupled, comprises a helix wound upon a cylinder and any portion of the primary winding may be considered as exactly superposed upon the corresponding portion of the secondary winding. Thus the juxtaposition or contiguous arrangement of the filaments of the primary and secondary windings is such as to produce substantially unity coupling between the windings, that is to say, the primary and secondary filaments are separated by a space no greater than the space occupied by the insulating covering of the wires or filaments. Preferably as shown, the filaments of the primary and secondary windings are twisted with a pitch which is relatively large compared to the diameters of the filaments. The frequent transposition of the windings in twisting materially aids also in holding the wires or filaments close together throughout their entire length, this so as to produce the intended results. While I prefer, for ease and economy of operation, to effect the close juxtaposition by twisting, it will be apparent that the same result may be accomplished in other ways.

It has been found that a transformer constructed and wound in this manner exhibits extremely desirable characteristics. By exercising care to prevent a separation between the filaments greater than the separation produced by the insulation, I am enabled to eliminate the undesired leakage inductance between the windings substantially completely. It has been found that a transformer constructed in this way gives higher average amplification with a more constant value over the wave length band than any other type of transformer thus far developed. The efficiency of this transformer construction is in some measure due to the high capacity between the windings which accompanies the close spacing of the bifilar section of the primary and secondary filaments throughout their entire lengths. The twisting of the filament pair in effectively preventing any primary turn from developing appreciable capacity at a different potential with respect to a secondary turn also contributes to the efficiency of the transformer. Another effect which is contributory to the successful result produced is the obtaining of relatively large air spaces in the winding due to the fact that the twisted pair may be wound at random; and these air spaces tend to reduce the distributed capacity of the coil.

Figure 4:
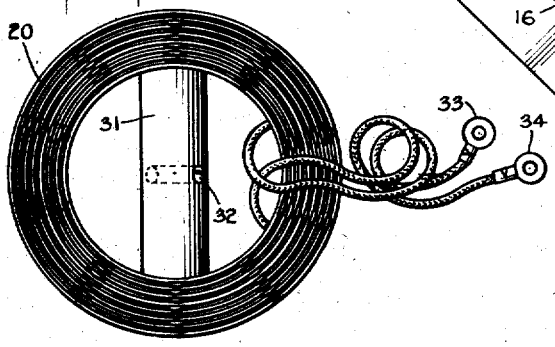
Fig. 4 is a plan view of the tickler coil shown in Fig. 1.

The tickler coil 20 may take any suitable and convenient form, such as that shown in Figs. 1 and 4, in which a plurality of turns are laterally spaced to form a helix and are spaced radially, by a zig-zag turn from the next row of helical turns. It will be understood that a duo lateral, or other similar coil of low distributed capacity, may be used.

Figure 5:
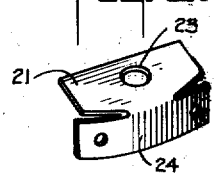
Fig. 5 is a detail of the supporting bracket shown in Figs. 1 and 3.
Figure 3:
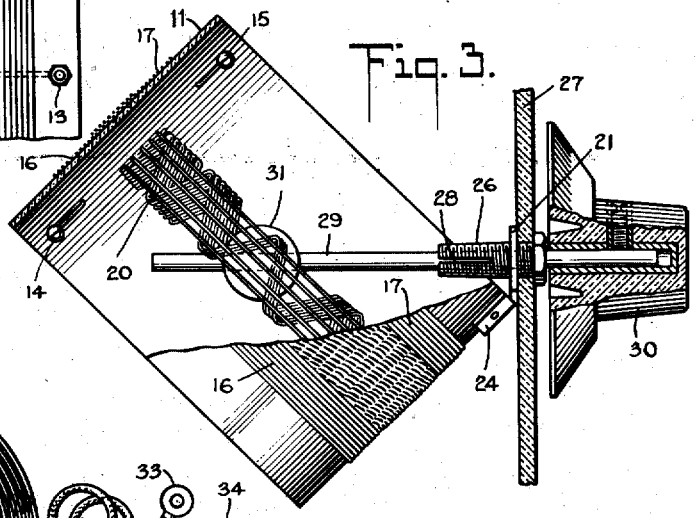
Fig. 3 is a view in side elevation, partly in section, of the structure shown in Fig. 1.

The tube or form 11 is adapted to be supported from a panel by means of a bracket 21, formed as shown in Fig. 5. This bracket may be stamped from sheet metal and bent to the form shown, having a flat top portion threaded at 23 and a bottom portion 24 which may be curved to fit the tube 11 and which may be secured thereto by rivets 25, or any other suitable means. A tubular bolt 26 is adapted to pass through the panel 27 and make threaded engagement with the flat portion of the support 21. As shown in Fig. 3, the inner end of the bolt 26 is split at 28 and the parts bent together to frictionally engage a shaft 29 which extends through the tubular bolt and is adapted to be moved by a knob 30, of any desired construction.

The tickler coil is provided with a round support member 31, having a hole 32 therein to frictionally receive the shaft 29. The support member 31 may be conveniently made of wood and the coil is preferably secured on the ends thereof by some suitable adhesive, while the opening 32 is held properly positioned relative to the axis of the coil which, in the construction shown, is at an angle of 45°. It will be understood that the ends 33 and 34 of the coil may be carried to suitable binding posts on the form 11, if desired, in order to faclitate wiring connections.

The coil may be conveniently formed by twisting the wire of the primary inductance upon the proper portion of the wire which is to form the secondary inductance, winding the twisted pair in its proper place on the form 11 and passing the ends of the primary winding down through the form or tube 11, and thence to the binding posts 12 and 13.

The end portions of the secondary winding may then be wound on to the form 11 in opposite directions and passed through to contact with the binding posts 14 and 15. With this construction it becomes possible to use a transformer of other than a one to one ratio having a very high mutual inductance or a very low leakage and yet secure small dielectric and capacity losses.

It will be noted that the support for the inductance is simple and entails making only one hole to permit its support from a panel. The grip of the split ends of the bolt 26 upon the shaft 29 is sufficent to hold the tubular coil in position at all times and the tickler coil may be readily changed or mounted by merely twisting the shaft 29 through the bolt 26 and the coil support 31. The tickler coil may be readily adjusted so that its central plane will coincide with the central planes of the primary and secondary inductances and the device as a whole may be readily assembled or dismounted.

It will also be noted that the primary windings and those windings of the secondary which are twisted with the primary bear the same equal capacitative relation to the tickler windings, neither the primary nor the secondary windings being interposed between the other and the tickler except where they cross.

It will be understood that many changes may be made in the design and construction of the parts without departing from the spirit of the invention, which is defined in the following claims.

What I claim is:

1. A transformer comprising a twisted pair of conductors, one conductor of said pair being continued beyond its twisted portion and formed into successive turns adapted to increase the inductance of its twisted portion.

2. A transformer comprising primary and secondary windings, one of said windings and at least a portion of the other of said windings being in the form of a twisted pair and formed into a closed coil to increase their inductance.

3. A transformer comprising a conductor wound in successive turns about an axis and a second conductor having a central portion twisted upon said first named conductor as it extends about said axis, and end portions formed in successive turns in inductive relationship to said central portion.

4. A transformer comprising primary and secondary conductors having portions thereof formed in a twisted pair and a third conductor having its axis and central plane coincident with the axis and central plane of said twisted pair portions.

5. A tuning device, comprising an inductance formed by a conductor wound in successive turns about an axis, a second inductance formed by a conductor having a portion twisted about said first conductor as it extends about said axis, and a third inductance, said primary and third inductances being relatively adjustable to a postion in which their central planes and axes coincide.

6. A tuning device, comprising primary and secondary windings, portions of said windings being twisted about each other to form a twisted pair and formed into a closed coil, and a third winding adjustable relative to said primary and secondary windings and having equal capacitative relation to the twisted portions of said primary and secondary windings.

7. A tuning device, comprising primary and secondary windings having portions thereof closely associated with each other to form a substantial capacitative coupling between them, and a third winding, said primary and secondary windings as a unit and said third winding being relatively adjustable, and the closely associated portions of said primary and secondary windings having equal capacitative relation to said third winding.

8. A tuning device comprising a primary inductance having a plurality of successive turns, a secondary inductance having a number of turns thereof closely associated with the turns of the primary inductance to form a substantial capacitative coupling therewith, and a third inductance, said primary and secondary inductances as a unit and said third inductance being relatively adjustable, the turns of said primary inductance and those turns of the secondary inductance closely associated therewith being so arranged as to have identical capacitative relation to said third inductance.

9. A transformer comprising primary and secondary windings, a filament of said primary winding and a filament of said secondary winding having portions wound bifilarly with the filaments arranged in close juxtaposition substantially throughout their entire lengths and forming a transformer section, and a filament of one of said windings having a portion wound separately to form an inductance section.

10. A transformer comprising primary and secondary winding sections, a filament of said primary winding section and a filament of said secondary winding section being wound bifilarly, the filaments of said winding sections being arranged in close juxtaposition substantially throughout their entire lengths, the said filaments being wound as a twisted pair.

11. A transformer comprising primary and secondary winding sections, a filament of said primary winding section and a filament of said secondary winding section being wound bifilarly, the filaments of said winding sections being arranged in close juxtaposition with a substantially unity coupling between said winding sections whereby the short wave mode of oscillation is suppressed through the elimination of leakage inductance between the windings, the filaments of said windings being wound as a twisted pair with a pitch relatively large compared to the diameters of the filaments.

12. A transformer comprising primary and secondary windings, a filament of said primary winding and a filament of said secondary winding having portions wound bifilarly with the filaments arranged in close juxtaposition substantially throughout their entire lengths and forming a transformer section, and a filament of one of said windings having a portion wound separately to form an inductance section, the said inductance section being inductively coupled to the said transformer section.

In testimony whereof I hereunto affix my signature, at Baltimore, in the county of Baltimore, and State of Maryland, this 20th day of March, 1928.

GEORGE H. WHITTINGHAM